US010430775B1

(12) United States Patent
Bialostocki et al.

(10) Patent No.: US 10,430,775 B1
(45) Date of Patent: Oct. 1, 2019

(54) VALIDATION AND LOOKUP TECHNIQUES FOR RULE-BASED DATA CATEGORIZATION

(75) Inventors: Guy Bialostocki, Seattle, WA (US); Daniel T. Mellott, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1665 days.

(21) Appl. No.: 13/294,962

(22) Filed: Nov. 11, 2011

(51) Int. Cl.
| | |
|---|---|
| *G06Q 40/00* | (2012.01) |
| *G06Q 20/20* | (2012.01) |
| *G06F 16/28* | (2019.01) |
| *H04L 12/741* | (2013.01) |

(52) U.S. Cl.
CPC ......... *G06Q 20/207* (2013.01); *G06F 16/285* (2019.01); *H04L 45/745* (2013.01)

(58) Field of Classification Search
CPC .... G06Q 20/207; G06F 16/285; H04L 45/745
See application file for complete search history.

(56) References Cited

U.S. PATENT DOCUMENTS

| | | | | |
|---|---|---|---|---|
| 6,606,710 B2* | 8/2003 | Krishnan | ............ | H04L 63/0263 |
| | | | | 726/1 |
| 8,239,299 B2* | 8/2012 | Dong et al. | ...................... | 705/35 |
| 2006/0020600 A1* | 1/2006 | Corl, Jr. | .................. | H04L 43/16 |
| 2006/0036504 A1* | 2/2006 | Allocca et al. | ................. | 705/26 |

FOREIGN PATENT DOCUMENTS

EP 1622049 A2 * 2/2006 ....... G06F 17/30327

OTHER PUBLICATIONS http://web.archive.org/web/20101122092059/http://www.cs.cmu.edu/afs/cs/project/theo-20/www/mlbook/ch3.pdf—lecture slides for textbook Machine Learning Tom M. Mitchell, McGraw Hill 1977.*

* cited by examiner

*Primary Examiner* — Florian M Zeender
*Assistant Examiner* — Milena Racic
(74) *Attorney, Agent, or Firm* — Lee & Hayes, P.C.

(57) ABSTRACT

Categorization of data may be performed using rule-based data categorization. Rules may be used to categorize the data into a limited number of categories for a temporary, ad hoc, or updatable process. The rules may be validated to make sure the rules are not ambiguous, contradictory, unattainable, or otherwise ineffective. The rules may include a priority value which may be used as a tie breaker when more than one rule applies to a record. To implement the rules, a lookup flow may be generated to enable rapid or quick traversal of applicable rules for a particular lookup while bypassing at least a portion of the rules. In some embodiments, a record (e.g., an item, etc.) may be categorized during a transaction process to determine a tax classification, a promotion, or another type of classification, which may then be used to complete the transaction.

23 Claims, 7 Drawing Sheets

VALIDATION AND LOOKUP TECHNIQUES FOR RULE-BASED DATA CATEGORIZATION

BACKGROUND

Many organizations and companies gather large amounts of data, which is often categorized and stored in databases or other data repositories. For example, a retailer often maintains an electronic catalog of items that includes all the items sold by the retailer. The electronic catalog typically includes various fields to store data about a particular item, such as a department, a class, a subclass, an item name, an item number, a price, a description, and/or other information. In some instances, the electronic catalog may become very large thereby making it difficult to manually categorize data, update large amounts of data, or otherwise make widespread changes to information in the electronic catalog or other data.

Besides effective storage and data accuracy, these organizations and companies often desire to have immediate access to the data stored in the databases or to information derived from the data stored in the databases. As the amount of data increases, an amount of time to access particular pieces of data or derive the information from the data typically takes longer, which may ultimately impact satisfaction of end users or customers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
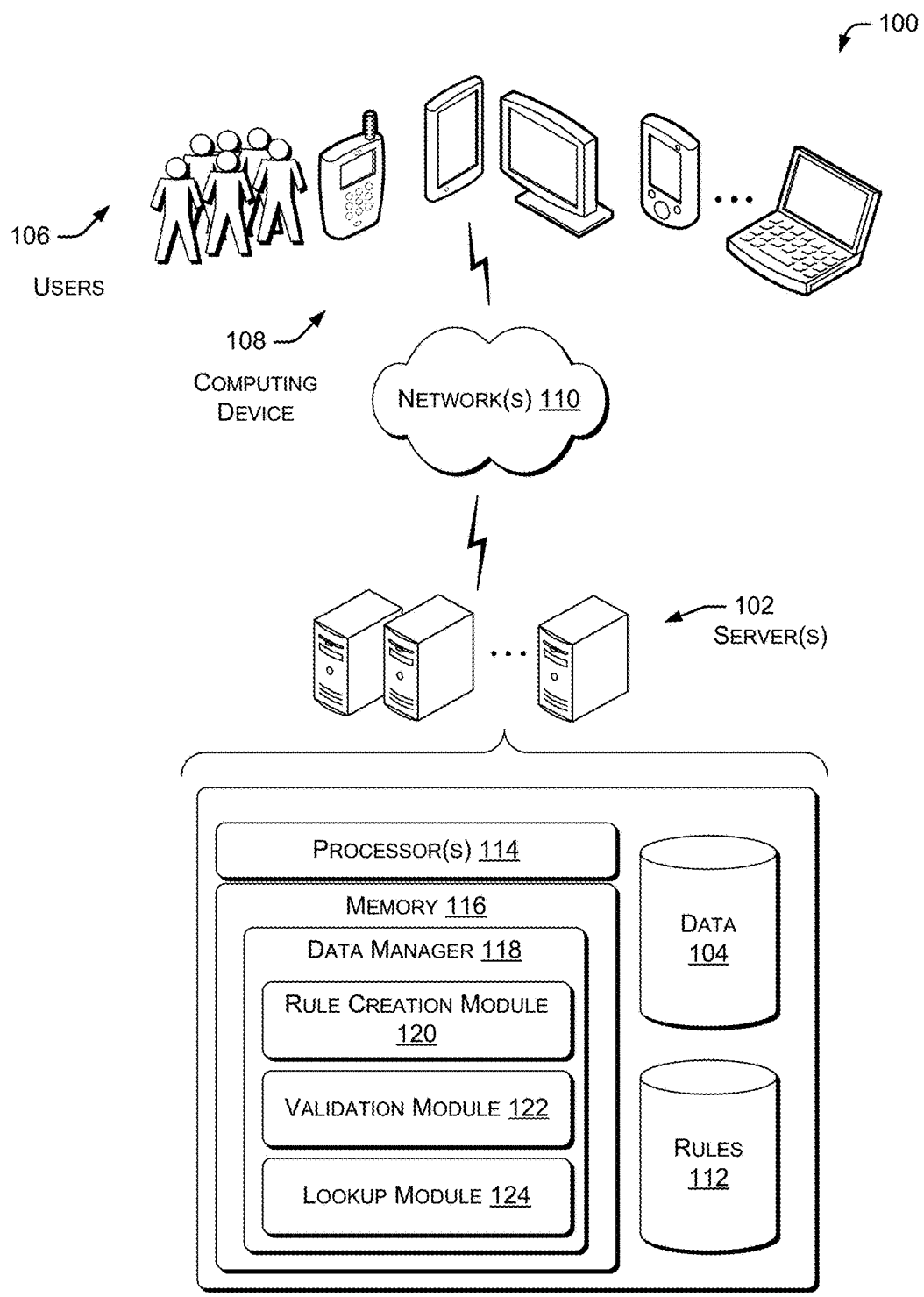
FIG. 1 is a schematic diagram of an illustrative computing environment to provide validation of categorization rules and a lookup flow for rule-based data categorization.

This disclosure is directed to, among other things, categorization of data using rule-based data categorization. The data may include data stored in one or more database as individual records. Each record may include various fields of data referred to as attributes of the record. For example, in a retailer's product database, each item may be represented by a record. The attributes may include a price, a name, a department, a size, a weight, a date of entry, and other types of attributes.

Often, large databases include some inconsistencies on how the data is stored in the database due to an amount of data contained in the database. For example, some databases may include thousands or even millions of unique records, each having many attributes associated with the particular record. Even when the attributes are input in accordance with well defined rules, the data may include some inconsistencies that make it difficult to classify data without writing specific rules. Often, the rules include conditions such as "contains" or other operators (e.g., wildcards, "greater than", string matches, etc.) to enable classification of similar data or attributes. For example, a query may include a condition of "contains (boy, Boy)" within a department of "clothing" to identify records that have attributes of "boy" or "Boy," such as when searching for records associated with boy's clothing in the database. As another example, a query may include a condition of "size (>6)" within a field of "size" and include a department of "shoes", thereby identifying records that have shoes sizes greater than size 6.

The rules may be used for many different purposes. Often the rules are used to categorize the data into a limited number of categories for a temporary, ad hoc, or updatable process. Thus, the rules may be used to avoid rewriting large amounts of the data in the database on a regular basis. The rules are often validated to make sure the rules are not ambiguous, contradictory, unattainable, or otherwise ineffective.

To implement the rules, a lookup flow may be generated to enable rapid or quick traversal of applicable rules for a particular lookup while bypassing at least a portion of the rules. In various embodiments, when looking up a categorization for an item, a lookup flow may traverse only rules that are relevant to the particular item and bypass irrelevant rules, thereby saving processing time and increasing workflow. In some embodiments, an item may be categorized in real time or near real time during a transaction process to determine a tax classification, a promotion, or another type of classification, which may then be used to complete the transaction (e.g., calculate a total amount due, etc.). In another example, the lookup flow may be used to categorize other types of data, such as a congressional district based on various data such as state rules, city rules, address information, and so forth.

The techniques and systems described herein may be implemented in a number of ways. Example implementations are provided below with reference to the following figures.

Illustrative Environment

FIG. 1 is a schematic diagram of an illustrative computing environment 100 to provide validation of categorization rules and a lookup flow for rule-based data categorization. The environment 100 includes one or more servers 102 that store data 104 and serve at least a portion of the data to users 106 upon request. The users 106 may receive the data 104 using computing devices 108 that are in communication with the servers 102 via a network 110.

In accordance with one or more embodiments, the server(s) 102 may be arranged in a distributed computing environment, a server farm, as a server cluster, or in other possible arrangements. The computing device 102 may include a personal computer, an electronic book reader device, a tablet computer, a mobile telephone (including a smart phone), a personal digital assistant (PDA), a television, a set top box, a gaming console, or another electronic, portable or handheld device. The network(s) 110 are representative of many different types of networks, such as cable networks, the Internet, local area networks, mobile telephone networks, wide area networks, wireless networks, or a combination of such networks.

In some embodiments, the data 104 may be include user account data, financial data, an electronic marketplace catalog, reference data, messaging data, social network data, or any other type of data. The server(s) may also store rules 112 that may be used to categorize, organize, or describe the data 104. The rules 112 may be used to assign a code or other type of information to the data 104, such as a product tax code, a promotion code, or other attributes based on attributes of records within the data 104. Although the data 104 may be any type of data, a non-limiting description that follows describes some embodiments where the data includes a catalog of goods and/or services offered by a merchant. This illustrative data may include many records of individual items or services, each having attributes such as a name, price, type, and so forth. In some embodiments, the data 104 may be stored in various databases, such as a pricing database, a product data base, and so forth. The data 104 may include one or more of these databases, which may linked by shared fields in the plurality of databases via software data structures.

In some embodiments, the server(s) 102 may include one or more processor(s) 114 and memory 116. The processor(s) 114 interact with the memory 116 to execute instructions and facilitate operation of the server(s) 102. The memory 116 may include software programs or other executable modules that may be executed by the processor(s) 114. Examples of such programs or modules include operating systems, applications (or "apps"), web browsers, program managers, and so forth. The memory 116 may also be used to store data, such as data files, audio and/or video media, documents, or the like.

The memory 116 may include volatile memory (such as RAM), nonvolatile memory, removable memory, and/or non-removable memory, implemented in any method or technology for storage of information, such as computer-readable instructions, data structures, program modules, or other data. Also, the processor(s) 114 may include onboard memory in addition to or instead of the memory 116. Some examples of storage media that may be included in the memory 116 and/or processor(s) 114 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the server(s) 102. Any such computer-readable media may be part of the server(s) 102.

In accordance with one or more embodiments, the memory 116 may include a data manager 118. The data manager 118 may interact with the data 104 to apply the rules 112, which may categorize or otherwise associate information with records in the data 104. The data manager 118 may include a rule creation module 120, a validation module 122, and a lookup module 124, each described in turn.

The rule creation module 120 may create rules that categorize the data 104. The rules may include conditions which specify values or value ranges for fields within the data 104. Records that include the specified values or value ranges in the fields may be eligible as a candidate for a rule. However, records may be categorized by more than a single rule. In such instances, the rule creation module may use a priority value (e.g., an order or ranking) of the rules to determine which rule to apply to the particular record. The rules may be implemented in real time or near real time, such as during a transaction, reporting processor, or other process that uses the data 104. For example, the rules may be applied to items during a transaction to determine a categorization of items for tax purposes, to determine items eligible for a promotion, or to otherwise categorize items prior to completing the transaction. In some embodiments, the rule creation module 120 may enable an administrator to create the rules.

The validation module 122 may analyze the rules 112 created using the rule creation module 120 to verify that the rules apply to at least one record in the data 104. As discussed above, some records may be categorized by more than a single record. In these instances, some rules, if implemented improperly, may not apply to any records when the rules are always outranked (e.g., based on the priority value) or when no records trigger use of the rule. The validation module 122 may analyze the rules to identify rules that are not used by any records or are always outranked by any other rule when applied to a record. This identification may be used in a recursive process with the rule creation module to adjust, delete, amend, or otherwise update the rules so that each rule categorizes at least one record in the data 104.

The lookup module 124 may create a lookup flow to organize the rules and enable application of a rule for a record without applying every rule created by the rule creation module. In some embodiments, the lookup module 124 may create a tree structure as the lookup flow that enables application of rules that traverse only a portion of the branches of the tree rather than requiring a full traversal of every rule in the tree structure. By limiting the number of rules that are tested or applied to a record, the lookup module 124 may dramatically reduce an amount of time to categorize a record using the rules when many rules are created by the rule creation module 120.

Illustrative Operation

Figure 2:
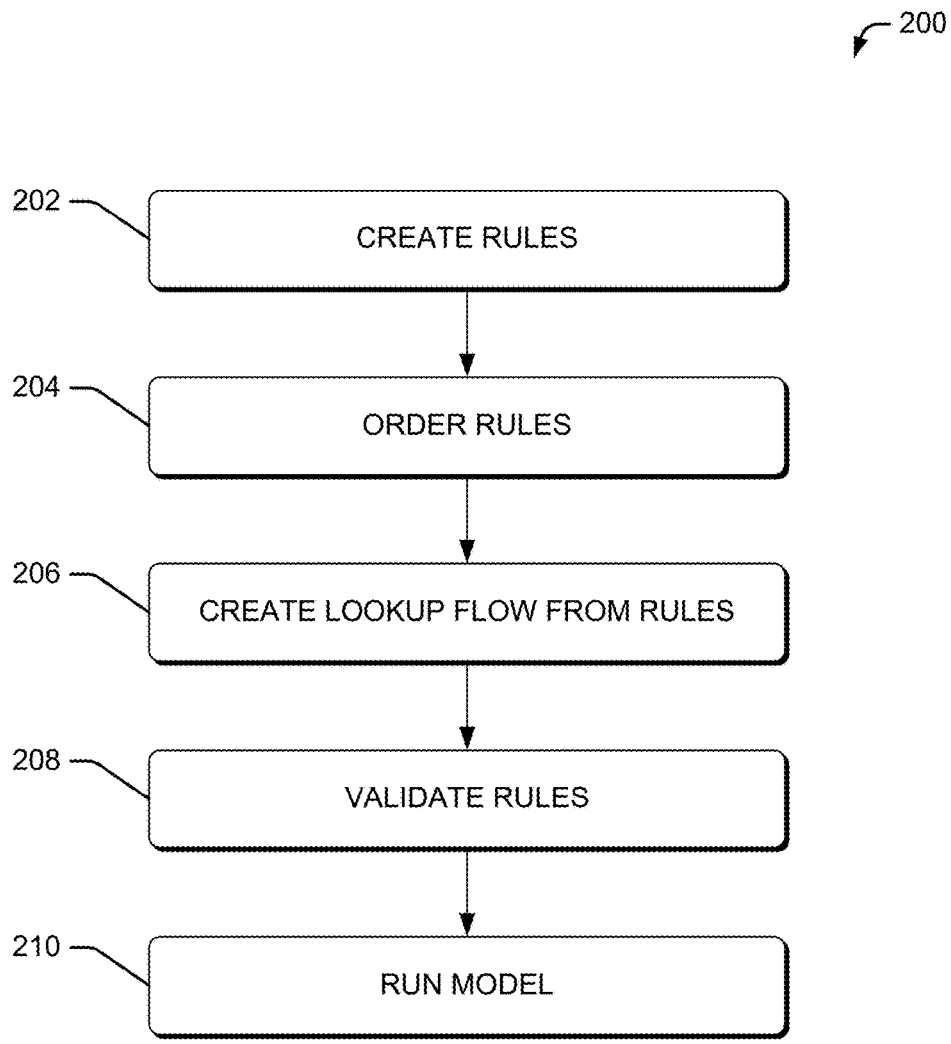
FIG. 2 is a flow diagram of an illustrative process to categorize data including validation of categorization rules and implementation of a lookup flow.

FIG. 2 is a flow diagram of an illustrative process 200 to categorize data including validation of categorization rules and implementation of a lookup flow. The process 200 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 202, the rule creation module 120 may create the rules 112 that may be applied to one or more records in the data 104. The rule creation module 120 may add new rules, update rules in the data, and/or remove rules. The changes to the rules may be implemented in a batch process or may be implemented as each change or collection of changes is created by the rule creation module 120.

At 204, the rule creation module 120 may prioritize or order the rules. The rules may be prioritized based on an assigned prioritization value, which may be assigned by an administrator or by the rule creation module 120. For example, the rule creation module 120 may assign a priority value as a unique identifier (ID) number to each rule. The rules may then be prioritized based on the unique ID. In some instances, the prioritization value may be assigned by an administrator to prioritize each rule in association with other rules. Thus, the administrator may prioritize a rule to have a high priority over other rules such that the particular rule is applied to a record even when other rules also apply to the particular record of the data 104. The priority value of the rules may then operate as a tie-breaker when two or more rules apply to a record and the rules provide different categorizations of the record.

At 206, lookup module 124 may create the lookup flow for the rules. The lookup flow may organize the rules in a tree structure such that only a portion of the rules are tested for a selected record. As the lookup flow is traversed during a lookup process, some rules are bypassed (i.e., not applied or tested for the record) as the lookup flow module 124 traverses the lookup flow to test or apply rules to the record.

At 208, the validation module 122 may test at least a portion of the records in the data using the lookup flow to ensure that an intended rule is applied to the record. For example, a rule may be created to categorize a record as "Type I". During a validation process, the validation module 122 may traverse the lookup flow to find rules that are applied to the record. When multiple rules are applied to the record, then the record with the highest priority based on the priority value may be applied to the record. In this example, the validation module 122 may determine whether this record is categorized as indented, thus categorized as "Type I" or whether the record is categorized by another rule. The categorization, via the lookup module 124 may include an identification of the rule, thus making it clear which rule is applied to categorize the record even when multiple rules apply to a record and may possibly categorize the record in the same manner (i.e., provide the same categorization value to the record). When the validation module 122 determines that a rule is not used as intended, then the data manager 118 may adjust the rule, adjust the lookup flow, adjust the priority value, or make other adjustment to ensure that each rule is applied to at least one record in the data 104.

At 210, the data manager 118 may run the model using the lookup module 124 to categorize records based on the rules and possibly on the priority values of the rules. The records may be categorized in real time or near real time such as during transaction involving a record of the data 104. The data manager 118 may store, for each record having the categorization, the result of the categorization by the rule, an identifier of the rule, and/or other metadata that describes the categorization process. In some embodiments, the data manager 118 may select a rule for the record from a plurality of rules that apply to the record based on the priority value of the rules. Thus, although a record may invoke use of more than one rule when the lookup flow is traversed during a run of the model, the record may only be assigned one of the rules based on the priority values of the rules that are invoked by the record.

Figure 3:
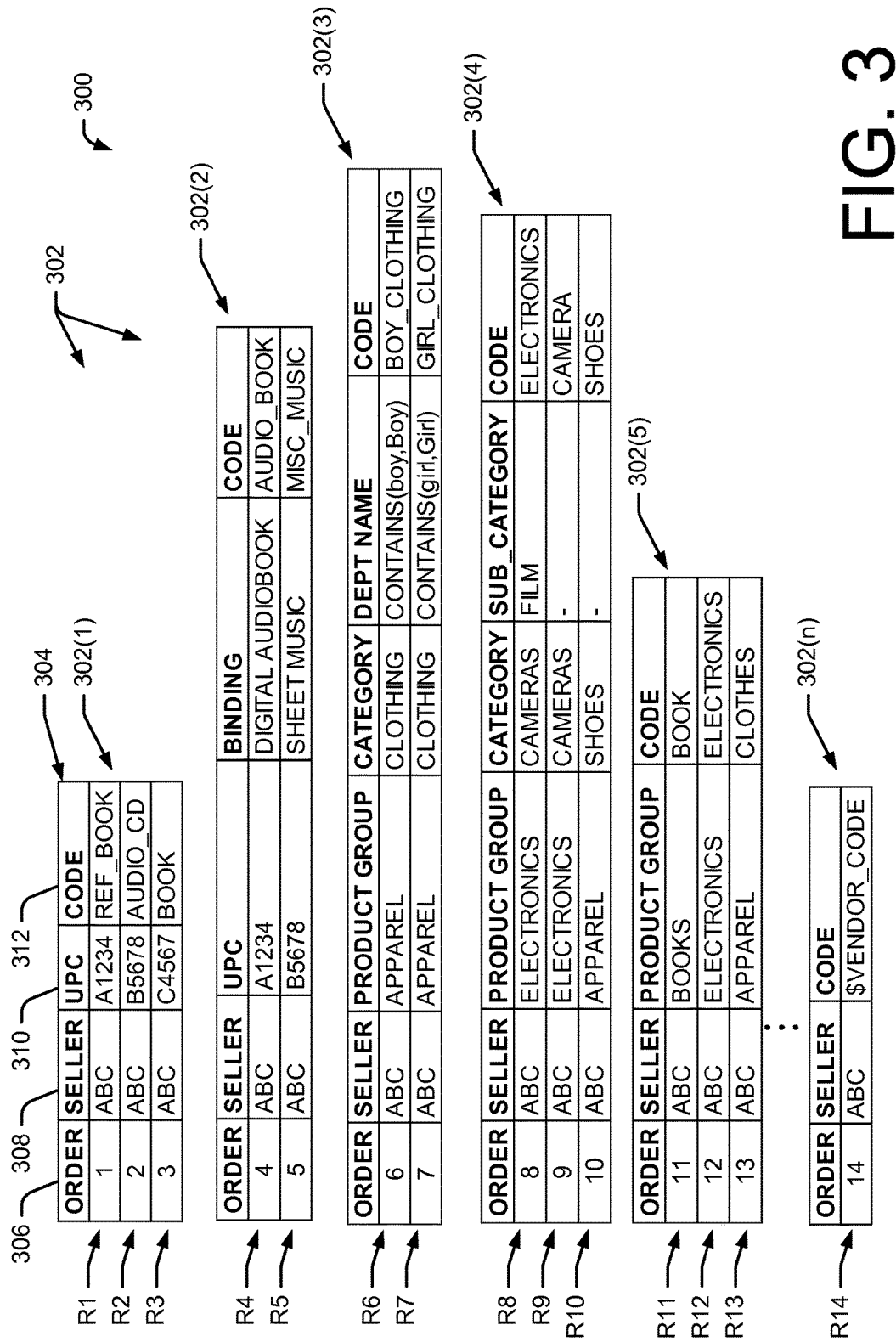
FIG. 3 shows sample categorization rules to categorize data.
Figure 4:
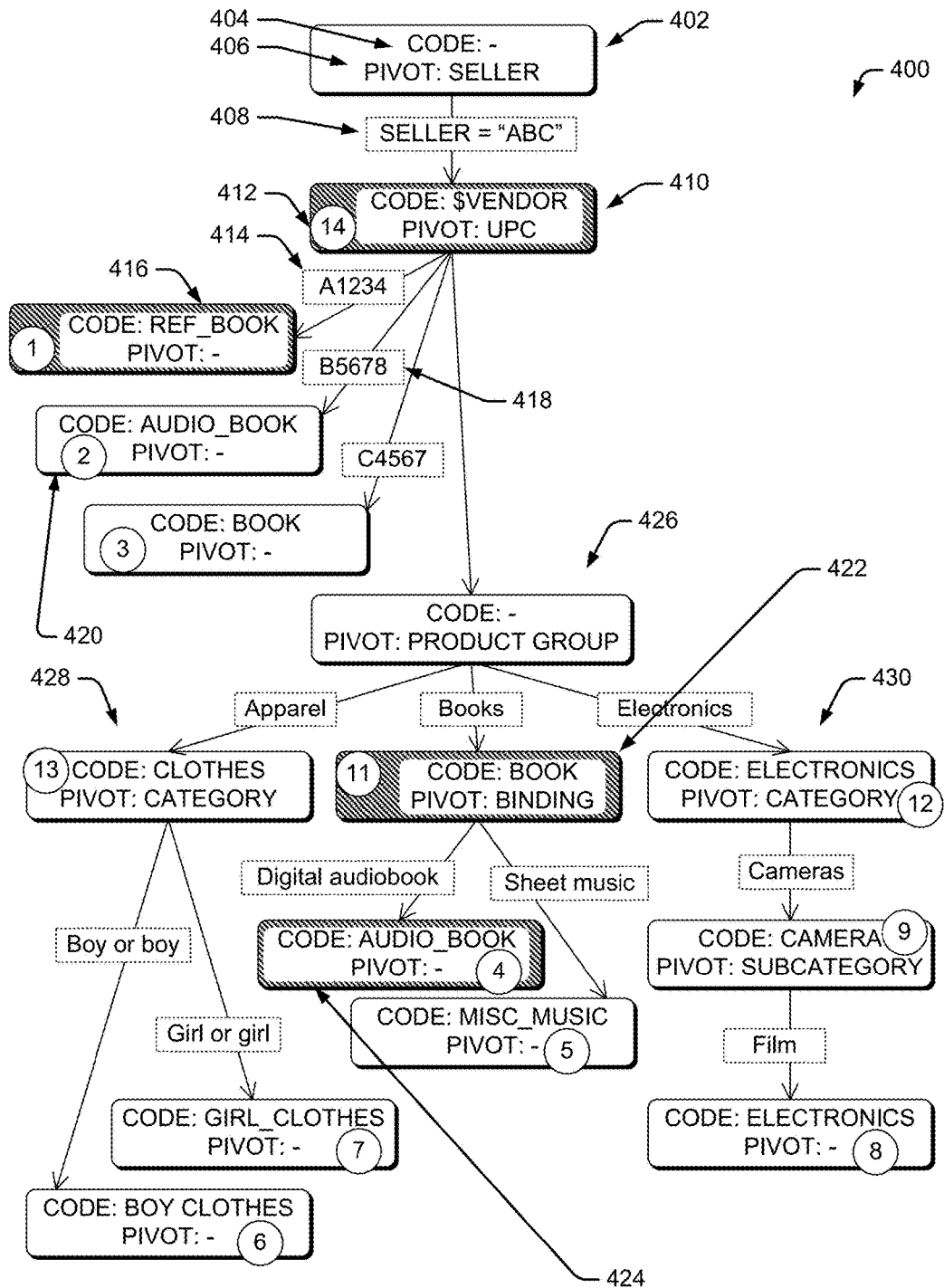
FIG. 4 shows an illustrative lookup flow to organize the sample categorization rules shown in FIG. 3.

FIG. 3 shows sample categorization rules 300 to categorize data. The categorization rules 300 show categorization of items in a catalog, where the categorization associated a code with a record. The code may be used as a product tax code, a promotional code, or other types of codes used for other purposes. Although the sample categorization rules 300 show items in an electronic catalog, other types of data and rules may be used in accordance with this disclosure. However, the following example, which is described with reference to FIGS. 3 and 4, is described using the sample categorization rules 300 for illustrative purposes.

The categorization rules 300 may include various groupings 302, such as a first grouping 302(1), a second grouping 302(2), and so forth through a last grouping 302(n). Each grouping may include a rule (e.g., R1, R2, etc.) with conditions for one or more fields 304 in the data 104. For example, the fields 304 used in the first grouping 302(1) may include an priority value 306, a seller field 308, an ID field 310 (e.g., a universal product code (UPC) or other good/service identifier), and a resulting code field 312 assignable to any item (or record) matching the criteria of the other fields (e.g., resultant of the rule). Thus, if the data 104 includes an item having a seller as "ABC" and a UPC as "A1234", then rule 1 (R1) would apply and potentially associate the code "REF_BOOK" to this item. However, other rules may also apply to this item, as discussed below. When other rules also apply to an item, then the priority value 306 may be used as a tie breaker to determine which rule to apply to the item.

As an example, an item having a record that lists a seller of "ABC", a UPC of "A1234" and a product group of "BOOKS" would cause rules 1 (R1) and 11 (R11) to be applied to the item. Since these rules each have different codes ("REF_BOOK" and "BOOK", respectively), then the priority value 306 may be applied as a tie breaker. When the lowest value of the priority value 306 wins (is selected), then rule 1 (R1) would be applied to this sample item which would assign a code of "REF_BOOK" to the item. In addition, the item may also be associated with metadata that indicates that the code "REF_BOOK" was assigned to the item using rule 1 (R1). This may enable auditing of the lookup flow at a later point or may be used for other purposes.

In some embodiments, the fields 304 may include logic or conditional statements, such as "contains( )", a wild card (e.g., "-"), a redirect value indicator "$", or other conditions, logic, or operators. The "contains( )" statement may apply to any items (records) that match conditions within the "contains( )" statement. The wild card may apply to any items (records) that include this field. The redirect value indicator may apply a code assigned by this attribute (e.g., vendor_code, etc.) rather than assigning a new code (e.g., may use existing data for a categorization). Other logic or conditional statements may also be used in the rules to apply the rules to specified records based on attributes of the records stored in the fields 304.

FIG. 4 illustrative lookup flow 400 to organize the sample categorization rules shown in FIG. 3. The lookup flow 400 may include only a portion of the rules 112 and is used for illustrative purposes to show application of rules for a sample item (record) without testing use of all the rules 112.

To illustrate use of the lookup flow 400, use of a sample item (record) is described. The sample item, selected for illustrative purposes, includes a seller of "ABC", a UPC of "A1234", a product group of "BOOKS", and a binding of "DIGITAL_AUDIOBOOK". The item may include other fields of data that list other attributes of this particular item.

In accordance with various embodiments, a traversal of the lookup flow 400 may be imitated by the lookup module 124 (or the data manager 118) at a first node 402. Each node, including the first node 402, may include a code value 404 and a pivot value 406. The code value 404 may be the code that may be assigned to the item when a corresponding rule from the node applies to the item. The pivot value 406 may be a condition for the next traversal along the lookup flow. As shown in the first node 402, the pivot value is "SELLER", which indicates that the seller field of the item will be inspected by the next node(s) in the lookup flow. Some nodes may not include a code (e.g., code="-") because the node is only a pivot node and used for traversal purposes though the rules 112 arranged in the lookup flow.

Traversing along the lookup flow 400, the sample item includes a first condition 408 of having a seller of "ABC" (pivot of the first node 402). A second node 410 may apply rule 14 (R14) to the item which may apply a code used by the vendor to the item (as indicated by a code designation of "$VENDOR"). This rule may include a priority value 412 of "14". As shown in FIG. 4, this node may be temporarily stored, logged, or otherwise analyzed as a possible candidate for the rule for the sample item.

Continuing the traversal through the lookup flow 400, the sample item may include the second condition 414 of the UPC of "A1234" (pivot of the second node 410), therefore applying the third node 416. The third node 416 may apply rule 1 (R1) to the sample item which may apply the code of "REF_BOOK" if the rule is selected, as discussed below. The third node 416 may include a priority value of "1". A next condition 418 may not apply to the sample item because the sample item does not have a UPC of "B5678", thus the fourth node 420 (and rule) may not be applied to the item to assign a code.

Continuing the traversal through the lookup flow 400, additional nodes 422 and 424 may also apply to the item, which correspond to rules 14 and 4, respectively. Each of these rules may be applied to the item, depending on the priority value of each of the rules. During the traversal from a node 426 to the node 422, the item that includes a product group of "BOOKS" may bypass branches of nodes 428 and 430, thereby reducing time to traverse the lookup flow 400. The bypassing may occur when a rule includes attributes that are different than the attributes of the item. For example, at node 428, the rule associated with this node includes an attribute of "APPAREL" in the product group, which is different than the attribute of "BOOKS" in the product group of the item. Thus, the lookup module 124 may bypass the node 428 and any other nodes along this branch of the lookup flow. Similarly, the node 430 may be bypassed because "ELECTRONICS" is a different product group than "BOOKS."

Upon completion of the traversal of the lookup flow 400, the item may trigger four rules, R14, R1, R11, and R4, which have priority values of 14, 1, 11, and 4, respectively. The rule to be applied to the sample item may be selected using the priority value. For example, the rule with the highest priority value (e.g., lowest number in an ordered list, etc.) may be applied to the item, which would select the rule 1 (R1), which provides the code of "REF_BOOK" to the sample item. However, other selection processes may be used to select the rule as an intended rule by the administrator.

Figure 5:
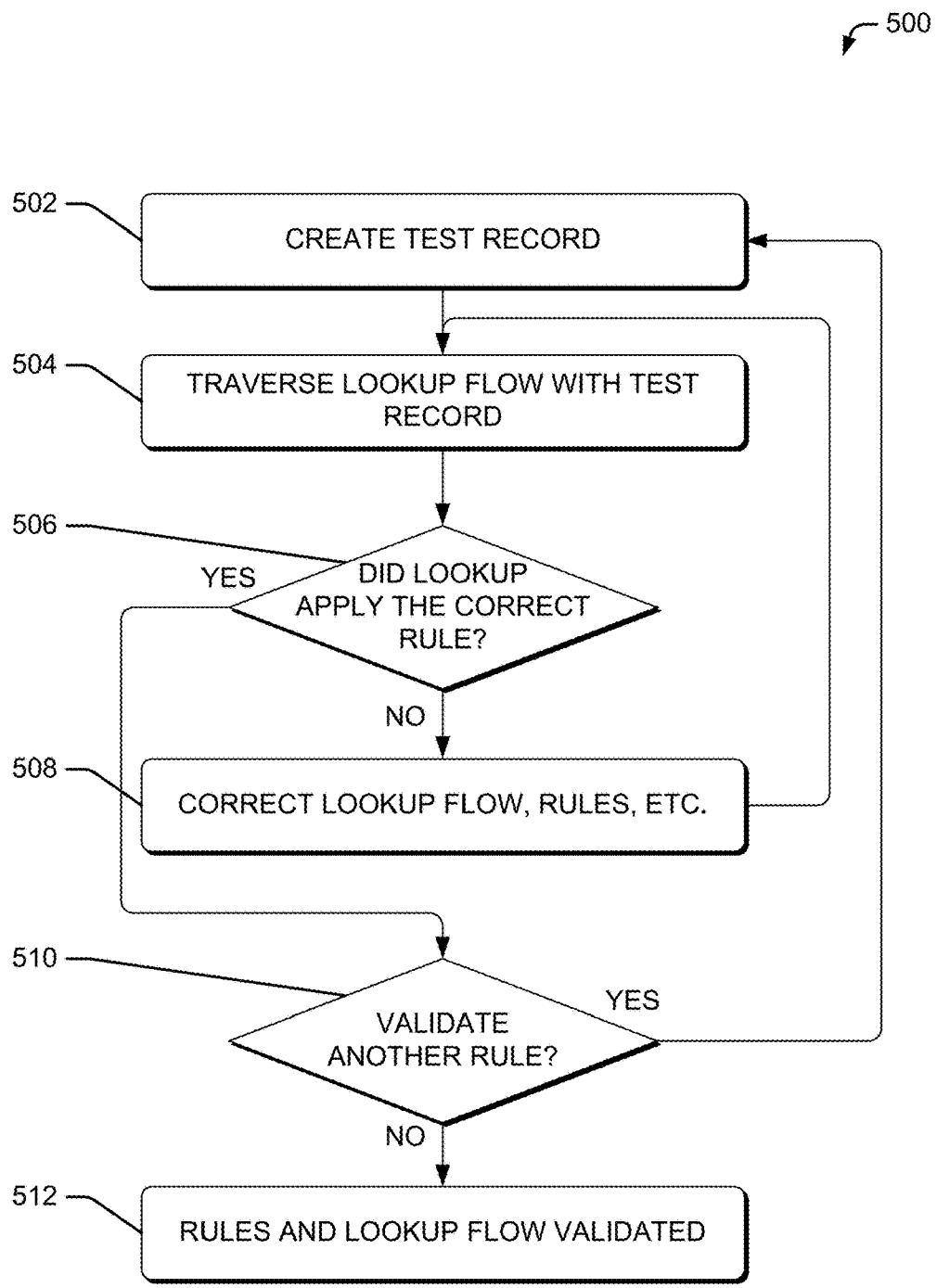
FIG. 5 is a flow diagram of an illustrative process to validate a categorization of rules.
Figure 6:
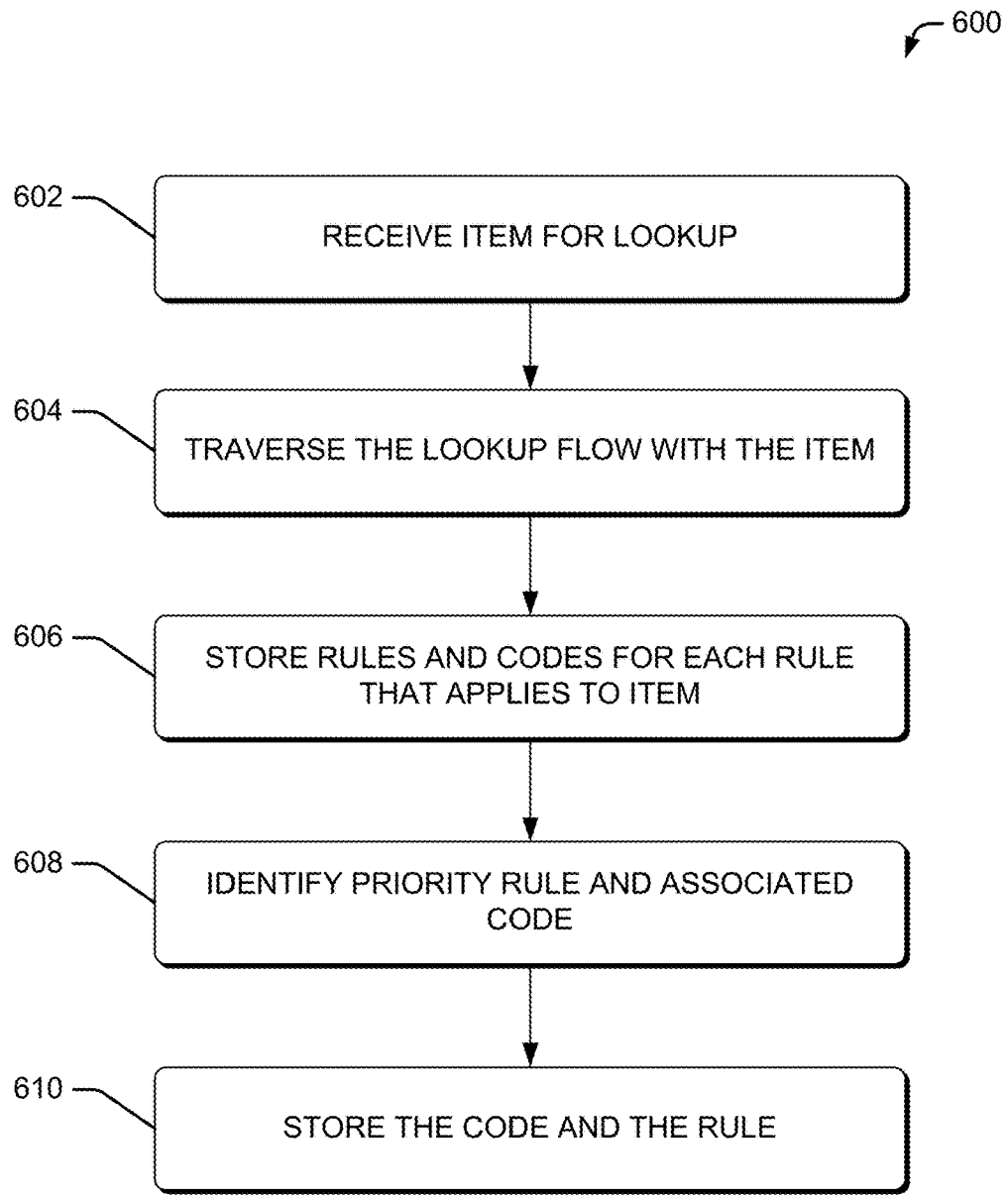
FIG. 6 is a flow diagram of an illustrative process to categorize an item using the lookup flow.
Figure 7:
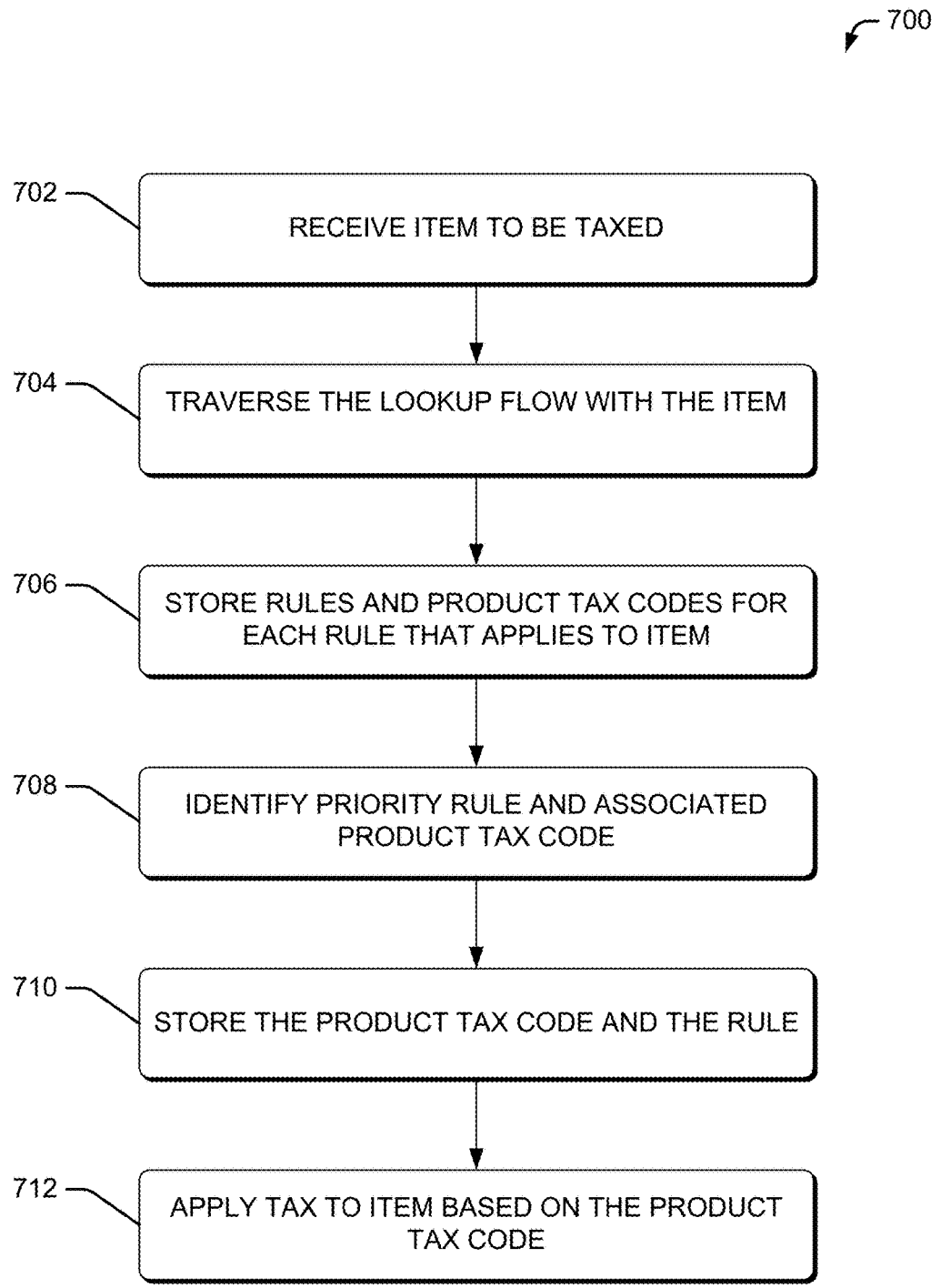
FIG. 7 is a flow diagram of an illustrative process to assign a product tax code to an item to enable determination of a tax for the item.

FIGS. 5-7 show illustrative processes performed by the data manager 118 or various modules. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 to validate a categorization of rules. The process 500 may be performed, at least in part, by the validation module 122 and is described with reference to the environment 100. However, the process 500 may be implemented by other modules and in other environments.

At 502, the validation module 122 create a test record. The test record may include attributes associated with a rule, such that the test record, when run through the lookup flow, is expected to trigger an application of the respective rule. For example, when the rule is rule 8 (R8) shown in FIG. 3, then the validation module 122 may create a test record that is intended to be subjected to the rule. In this example, the test record may have a seller of "ABC", a product group of "ELECTRONICS", a category of "CAMERAS", and a sub category of "FILM". The test record may include null values for other attributes At 504, the validation module 122 may traverse the lookup flow with the test record from the operation 502.

At 506, the validation module 122 may determine whether the traversal of the lookup flow and selection of the rule, possibly using the priority value as a tie breaker, resulted in selection of the correct rule (e.g., rule 8 (R8) in the above example). When the incorrect rule is selected (following the "no" route at operation 506), then the validation module 122 may trigger a correction in the rules, an update the lookup flow, or a reprioritization rules. After the correction (or update), then the process 500 may resume at the operation 504.

When the correct rule is selected (following the "yes" route at operation 506), then the validation module 122 may determine whether another rule shall be validated. When another rule is to be validated (following the "yes" route at the operation 510), then the process 500 may proceed to the operation 502. When no additional rules are to be validated and no rules remain invalid, then the process 500 may proceed to an operation 512 which may declare the rules and lookup flow as validated.

In some embodiments, the validation module 122 may perform the process 500 without user input or with minimal user input. For example, the validation module 122 may create the test records for all the rules at the operation 502. The correction of the lookup flow and/or rules may include a reordering of the rules to ensure that the intended rule is selected and applied to the item in accordance with any tie breaking rules. In some embodiments, the process 500 may be automatically run after each update of the rules and/or update of the lookup flow.

FIG. 6 is a flow diagram of an illustrative process 600 to categorize an item using the lookup flow. The process 600 may be performed, at least in part, by the lookup module 124 and is described with reference to the environment 100. However, the process 600 may be implemented by other modules and in other environments. The process 600 may be used to associate a code with an item, a server, or another record of the data 104 using the rules 112. For example, the code may be a product tax code, an item promotion code, or another type of code.

At 602, the lookup module 124 may receive an item for lookup. For example the item may be a good or service that a customer desires to purchase during a transaction with a merchant.

At 604, the lookup module 124 may traverse the lookup flow with the item received at the operation 602. For example, the lookup flow may be traversed as described above in reference to the lookup flow 400 shown in FIG. 4.

At 606, the lookup module 124 may store rule identifier and resultant code for each rule that applies to the item during the traversal of the lookup flow. For instance, in the example traversal of the lookup flow 400, the rules 14, 1, 11, and 4 may all be stored along with the code associated with each rule.

At 608, the lookup module 124 or the data manager 118 may identify a priority rule and an associated code. The priority rule may be identified based on the priority value assigned to each rule. For example, a tie breaker process may be applied to select a priority rule based on the priority value of each of the rules applied to the item.

At 610, the lookup module 124 or the data manager 118 may store the code and the rule for association with the item.

FIG. 7 is a flow diagram of an illustrative process 700 to assign a product tax code to an item to enable determination of a tax for the item. The process 700 may be performed, at least in part, by the lookup module 124 and is described with reference to the environment 100. However, the process 700 may be implemented by other modules and in other environments. The process 700 may be used to associate a product tax code with an item in a transaction.

At 702, the lookup module 124 may receive an item for lookup. For example the item may be a good or service that a customer desires to purchase during a transaction with a merchant.

At 704, the lookup module 124 may traverse the lookup flow with the item received at the operation 702. For example, the lookup flow may be traversed as described above in reference to the lookup flow 400 shown in FIG. 4.

At 706, the lookup module 124 may store rules and product tax codes for each rule that applies to the item during the traversal of the lookup flow.

At 708, the lookup module 124 or the data manager 118 may identify a priority rule and an associated product tax code. The priority rule may be identified based on the order assigned to each rule. For example, a tie breaker process may be applied to select a priority rule based on the order of each of the rules applied to the item.

At 710, the lookup module 124 or the data manager 118 may store the product tax code and the rule for association with the item.

At 712, the data manager 118 may apply a tax to the item based on the product tax code identified at the operation 708.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method of providing improved access to a database to reduce processing time and increase workflow, the method comprising:
   under control of one or more servers configured with executable instructions,
   receiving rules that assign product tax codes to items in an electronic catalog based at least in part on one or more attributes of the items;
   assigning different priority values to the rules, the priority values uniquely identifying a priority of the rules to operate as a tie breaker when more than one rule applies to one item;
   arranging the rules in a lookup flow having a tree structure that enables traversal of the lookup flow while bypassing at least a portion of the rules, wherein the rules in the lookup flow are arranged based at least in part on attribute values, a first rule having a first attribute being arranged in a different branch of the tree structure than a second rule having a second, different attribute;
   identifying at least the first rule and a third rule that apply to an item based at least in part on one or more attributes of the items by traversing the lookup flow, wherein the traversing the lookup flow includes bypassing the second rule based at least in part on the arranging of the rules in the lookup flow to reduce the processing time of the workflow, wherein the bypassing includes determining that a node associated with the second rule includes the different attribute and does not include the first attribute, and wherein the bypassing includes bypassing at least one sub-node of the node associated with the second rule;
   determining a priority value of the first rule and a priority value of the third rule;
   assigning a product tax code to the item using a code from the first rule based at least in part on the priority value of the first rule; and
   completing a transaction using the product tax code assigned to the item.

2. The computer-implemented method as recited in claim 1, further comprising validating, prior to the identifying, that each of the rules in the lookup flow applies to at least one item.

3. The computer-implemented method as recited in claim 1, further comprising applying the priority values as a tie breaker to select one rule of the one or more identified rules when the assigning the product tax code to the item results in identification of two or more rules for the item.

4. The computer-implemented method as recited in claim 1, further comprising calculating a sales tax for the item based at least in part on the product tax code.

5. A method comprising:
   receiving rules that assign codes to records in a dataset based at least in part on one or more attributes stored in the records;
   assigning different priority values to the rules, the priority values including at least a first priority for a first rule, a second priority for a second rule, and a third priority for a third rule, the priority values operating as a tie breaker when more than one rule applies to one record;
   arranging the rules in a lookup flow having a tree structure that enables traversal of the lookup flow while bypassing at least a portion of the rules, wherein the rules in the lookup flow are arranged based at least in part on attribute values, a first rule having a first attribute being arranged in a different branch of the tree structure than a second rule having a second, different attribute;
   identifying at least the first rule and the third rule, during a traversing of a portion, but not all, of the tree structure of the lookup flow, the at least the first rule and the third rule being associated with a record based at least in part on having a common attribute of the one or more attributes, and the second rule bypassed during the traversing of the tree structure of the lookup flow to reduce a processing time of the lookup flow, wherein bypassing includes determining that a node associated with the second rule includes the different attribute and does not include the first attribute, and wherein the bypassing includes bypassing at least one sub-node of the node associated with the second rule;

selecting the first rule to assign a code to the record based at least in part on respective priority values of the first priority of the first rule and the third priority of the third rule;

applying, to the record, the code corresponding to the first rule; and completing a transaction based at least in part on the first rule and the record.

6. The method as recited in claim 5, wherein the dataset includes a plurality records within a plurality of databases that are linkable by shared fields in the plurality of databases.

7. The method as recited in claim 5, wherein the dataset includes records of items available for consumption in an electronic marketplace.

8. The method as recited in claim 5, further comprising validating that each of the rules in the lookup flow applies to at least one record.

9. The method as recited in claim 8, wherein the validating includes, for each rule:
   selecting a test record that is intended to be subjected to the rule;
   identifying rules that apply to the test record by traversing the lookup flow;
   applying the priority values of the identified rules that apply to the test record; and
   determining whether a correct rule is associated with the test record.

10. The method as recited in claim 9, further comprising updating at least one of the lookup flow, the rules, or the priority values when the correct rule is not associated with the test record.

11. The method as recited in claim 5, further comprising storing the code and an indication of the first rule with the record after the applying the code corresponding to the first rule.

12. The method as recited in claim 5, wherein the lookup flow includes a plurality of nodes that each include at least a pivot field and a code field, the pivot field to store a pivot value associated with at least one attribute of the records in the dataset or a null value when the node is at an end of a branch of the tree structure, the code field to store the code or a null value when the node does not assign a code.

13. The method as recited in claim 12, wherein the traversing the lookup flow includes traversing at least a portion of the plurality of nodes using the pivot fields and the code fields to identify the rules that apply to the record.

14. One or more non-transitory computer-readable media storing computer-executable instructions that, when executed on one or more processors, performs acts comprising:
   receiving rules that assign codes to records in a dataset based at least in part on one or more attributes stored in the records, the rules having different priority values including at least a first priority for a first rule, a second priority for a second rule, and a third priority for a third rule, the priority values operating as a tie breaker when more than one rule applies to one record;
   arranging the rules in a lookup flow having a tree structure that enables traversal of the lookup flow while bypassing at least a portion of the rules, wherein the rules in the lookup flow are arranged based at least in part on attribute values, a first rule having a first attribute being arranged in a different branch of the tree structure than a second rule having a second, different attribute;
   identifying at least the first rule and the third rule, during a traversal of the lookup flow, the at least the first rule and the third rule being associated with a record based at least in part on having a common attribute of the one or more attributes;
   bypassing at least the second rule during the traversal of the lookup flow based at least in part on the second rule not having the common attribute of the one or more attributes to reduce a processing time of the lookup flow, wherein the bypassing includes determining that a node associated with the second rule includes the different attribute and does not include the first attribute, and wherein the bypassing includes bypassing at least one sub-node of the node associated with the second rule;
   selecting the first rule to assign a code to the record based at least in part on the priority values of the first priority of the first rule and the third priority of the third rule; and
   applying, to the record, the code corresponding to the first rule.

15. The one or more non-transitory computer-readable media as recited in claim 14, wherein the dataset includes a plurality of records within a plurality of databases that are linkable by shared fields in the plurality of databases.

16. The one or more non-transitory computer-readable media as recited in claim 14, wherein the acts further comprise validating that each of the rules in the lookup flow applies to at least one record.

17. The one or more non-transitory computer-readable media as recited in claim 14, wherein the acts further comprise storing the code and an indication of the first rule with the record after the applying the code corresponding to the first rule.

18. The one or more non-transitory computer-readable media as recited in claim 14, wherein the dataset includes records of items available for consumption in an electronic marketplace.

19. The one or more non-transitory computer-readable media as recited in claim 14, wherein the code is at least one of a product tax code identifying a tax classification for an item or a promotion code identifying a promotion classification associated with the item.

20. A system comprising:
   one or more processors; and
   memory coupled to the one or more processors, the memory comprising:
      a rule creation module to create rules that assign codes to records in a dataset based at least in part on one or more attributes stored in the records, the rules including at least a first rule, a second rule, and a third rule, each rule having a priority value including at least a first priority value associated with the first rule, a second priority value associated with the second rule, and a third priority value associated with the third rule, the priority values operating as a tie breaker when more than one rule applies to one record; and
      a lookup module to:
         arrange the rules in a lookup flow having a tree structure that enables traversal of the lookup flow while bypassing at least a portion of the rules, wherein the rules in the lookup flow are arranged based at least in part on attribute values, a first rule having a first attribute being arranged in a different branch of the tree structure than a second rule having a second, different attribute, identify at least the first rule and the third rule, during a traversal of the lookup flow, the at least the first rule and the third rule being associated with a record based at least in part on having a common attribute of the one or more attributes, bypass at least the second rule during the traversal of the lookup flow based at least in part on the second rule not having the common attribute of the one or more attributes to reduce a processing time of the lookup flow, wherein the bypass includes a determination that a node associated with the second rule includes the different attribute and does not include the first attribute, and wherein the bypass further includes the bypass of at least one sub-node of the node associated with the second rule, select the first rule to assign a code to the record based at least in part on the respective priority values of the first priority value of the first rule and the third priority of the third rule; and apply, to the record, the code corresponding to the first rule.

21. The system as recited in claim 20, wherein the memory further comprises a validation module to validate that each of the rules in the lookup flow applies to at least one record.

22. The system as recited in claim 20, wherein the records include attributes of items available in an electronic catalog.

23. The system as recited in claim 20, wherein the codes are product tax codes; and wherein the lookup module further calculates a sales tax for an item based at least in part on the product tax code.

* * * * *